Patented July 24, 1928.

1,678,429

UNITED STATES PATENT OFFICE.

ALPHONSE GAMS AND PAUL SCHEIDEGGER, OF BASEL, SWITZERLAND, ASSIGNORS TO THE FIRM SOCIETY OF CHEMICAL INDUSTRY IN BASLE, OF BASEL, SWITZERLAND.

ORGANIC GOLD COMPOUNDS AND PROCESS OF MAKING SAME.

No Drawing. Application filed July 14, 1927, Serial No. 205,840, and in Switzerland August 25, 1926.

The present invention relates to the manufacture of complex gold compounds of nucleic acid, useful in therapeutics and it comprises the new compounds themselves as well as the process of making same.

It has been found that complex gold compounds of nucleic acids, wherein the gold cannot be detected by the usual reagents, such as for instance alkalies, may be obtained by reacting upon a water soluble salt of a nucleic acid with a gold compound.

The reaction may be effected in a neutral or basic or acid medium.

If the reaction is conducted in a neutral or basic medium, the water soluble complex gold-alkali-compounds of nucleic acids are obtained; by working in an acid medium, the free gold nucleic acid compounds insoluble in water are formed, which by treatment with alkalies may be transformed into the water soluble gold-alkali-compounds of the nucleic acids.

By varying the conditions of reaction, especially the proportion of the gold compound made to react upon the nucleic acid viz nucleate, compounds of different composition are obtained.

The water soluble compounds may be separated from their aqueous solutions by suitable indifferent organic precipitants, for instance alcohol.

The invention is illustrated by the following examples, the parts being by weight:—

Example 1.

To 50 parts of sodium nucleate, dissolved in 300 parts of water, 11 parts of gold chloride in aqueous solution are added. The clear reddish-yellow coloured solution is neutralized with a caustic alkali or an alkali carbonate, and the gold compound of nucleic acid precipitated by alcohol, thoroughly washed with the same solvent and dried in vacuo. The new complex gold sodium compound of nucleic acid is obtained as a reddish-yellow powder containing about 10 per cent of gold. It is clearly soluble in water, the solution is stable to boiling.

Example 2.

To a solution of 50 parts of sodium nucleate 100 parts of a normal solution of sodium carbonate and of an aqueous solution of 11 parts of gold chloride are added. After some hours the clear solution is neutralized or made feebly acid with acetic acid and the gold sodium compound of nucleic acid precipitated with alcohol. It forms, after drying, a yellow powder, being easily soluble in hot water, somewhat slowly but also clearly soluble in cold water. It contains about 10 per cent of gold.

Example 3.

To a solution of 60 parts of sodium nucleate in 300 parts of water 13 parts of gold chloride in aqueous solution are added. The gold nucleic acid compound formed is precipitated from its clear solution by alcohol. The precipitate is stirred with 300 parts of an $\frac{n}{2}$ solution of caustic soda, whereby it is clearly dissolved. The solution thus obtained is neutralized or made weakly acid with acetic acid and the gold sodium nucleic acid compound reprecipitated by alcohol. After drying in vacuo it forms a yellow powder, very easily soluble in cold as well as in hot water. It contains about 10 per cent of gold.

Example 4.

100 parts of sodium nucleate are dissolved in water and added with 22 parts of gold chloride in aqueous solution. The complex gold nucleic acid compound thus obtained is precipitated by adding mineral acid until the reaction of the solution is acid. The reddish precipitate is filtered off, washed out and dried; it contains the bulk of the nucleic acid and the gold content of the dried substance amounts to about 5 per cent. This compound may be transformed into the water soluble gold alkali nucleic acid compound as described in Example 3.

If in this example instead of 22 parts of gold chloride the double quantity is employed a gold alkali nucleic acid compound of about the double gold content is obtained.

Instead of sodium nucleate other water soluble nucleates, for instance potassium nucleate, may be used. Instead of starting with a water soluble nucleate one may of course perform the reaction with the same result by dissolving free nucleic acid in a corresponding quantity of an alkali compound capable of reacting with nucleic acid to form a water soluble nucleate, for instance alkali hydroxide, alkali carbonate, alkali acetate, and the like.

What we claim is:—

1. A process for the production of stable complex gold compounds of nucleic acids by reacting with a gold compound upon a water soluble nucleate.

2. A process for the production of water soluble complex gold compounds of nucleic acids by reacting with a gold compound upon a water soluble nucleate in a non-acid medium.

3. A process for the production of water soluble complex gold alkali compounds of nucleic acids by reacting with a gold compound upon a water soluble alkali nucleate.

4. A process for the production of water soluble complex gold alkali compounds of nucleic acids by reacting with a gold compound upon a water soluble alkali nucleate in a non-acid medium.

5. A process for the production of water soluble complex gold alkali compounds of nucleic acids by reacting with a gold compound upon a water soluble alkali nucleate and precipitating the solution thus obtained with an indifferent organic solvent, wherein the complex gold alkali compound is insoluble.

6. A process for the production of water soluble complex gold alkali compounds of nucleic acids by reacting with a gold compound upon a water soluble alkali nucleate in a non-acid medium and precipitating the solution thus obtained with an indifferent organic solvent, wherein the complex gold alkali compound is insoluble.

7. A process for the production of water soluble complex gold alkali compounds of nucleic acids by treating an insoluble complex gold compound of nucleic acid with an alkali, adding an acid substance to the solution thus obtained in a quantity at least sufficient to make the reaction neutral and then precipitating the gold alkali compound with an indifferent solvent wherein it is insoluble.

8. A process for the production of a water-soluble complex gold sodium compound of nucleic acid by reacting with a gold compound upon sodium nucleate.

9. A process for the production of a water-soluble complex gold sodium compound of nucleic acid by reacting with a gold compound upon a solution obtained by dissolving nucleic acid in an equivalent amount of a sodium compound yielding a sodium salt with nucleic acid.

10. As new products stable complex gold compounds of nucleic acids, wherein the gold cannot be detected by the usual reagents and which constitute yellow to reddish coloured powders, being useful in therapeutics.

11. As new products stable complex gold alkali compounds of nucleic acids, wherein the gold cannot be detected by the usual reagents and which constitute yellowish coloured powders soluble in water and useful in therapeutics.

12. As new products stable complex gold sodium compounds of nucleic acids, wherein the gold cannot be detected by the usual reagents and which constitute yellowish powders soluble in water and useful in therapeutics.

In witness whereof we have hereunto signed our names this 5th day of July, 1927.

ALPHONSE GAMS.
PAUL SCHEIDEGGER.